(12) United States Patent
Zhao et al.

(10) Patent No.: US 12,277,784 B2
(45) Date of Patent: Apr. 15, 2025

(54) INTELLIGENT ENERGY DEVICE BASED ON REAL-TIME VISUAL ANALYSIS OF LAPAROSCOPIC VIDEO

(71) Applicant: Genesis Medtech (USA) Inc., Saint Louis Park, MN (US)

(72) Inventors: Bin Zhao, Ellicott, MD (US); Ning Li, Pittsburgh, PA (US); Shan Wan, Plymouth, MN (US)

(73) Assignee: GENESIS MEDTECH (USA) INC., Saint Louis Park, MN (US)

( * ) Notice: Subject to any disclaimer, the term of this patent is extended or adjusted under 35 U.S.C. 154(b) by 304 days.

(21) Appl. No.: 17/982,808

(22) Filed: Nov. 8, 2022

(65) Prior Publication Data

US 2023/0141081 A1    May 11, 2023

Related U.S. Application Data

(60) Provisional application No. 63/277,513, filed on Nov. 9, 2021.

(51) Int. Cl.
*G06V 30/10*    (2022.01)

(52) U.S. Cl.
CPC .... *G06V 30/10* (2022.01); *G06T 2207/30176* (2013.01)

(58) Field of Classification Search
CPC ............... G06V 30/10; G06V 40/145; G06T 2207/30176
See application file for complete search history.

(56) References Cited

U.S. PATENT DOCUMENTS

| | | | |
|---|---|---|---|
| 12,131,818 B2* | 10/2024 | Mitrea | A61B 34/10 |
| 2015/0268226 A1 | 9/2015 | Bhargava et al. | |
| 2019/0192243 A1 | 6/2019 | Xu et al. | |
| 2019/0206055 A1* | 7/2019 | Gurcan | G06T 7/11 |
| 2022/0104897 A1* | 4/2022 | Shelton, IV | G06F 3/1423 |
| 2023/0329790 A1* | 10/2023 | Roh | G16H 40/67 |
| 2024/0099763 A1* | 3/2024 | Batchelor | G06T 7/0012 |

FOREIGN PATENT DOCUMENTS

CN    112869787 A    6/2021

OTHER PUBLICATIONS

International Application No. PCT/US22/49250, International Search Report and Written Opinion mailed Mar. 2, 2023, 15 pages.

* cited by examiner

*Primary Examiner* — Shahbaz Nazrul
(74) *Attorney, Agent, or Firm* — MagStone Law, LLP; Enshan Hong

(57) ABSTRACT

A console is disclosed. The console includes: an image receiving module configured to receive image data from a first device connected to the console; an image processing module in communication with the image receiving module, the image processing module configured to process the received image data to determine tissue characteristic data; a mode determination module in communication with the image processing module, the mode determination module configured to determine, based on the tissue characteristic data, an operation mode of a second device connected to the console; and a control module in communication with the mode determination module, the control module configured to control an operation of the second device based on the determined operation mode.

18 Claims, 4 Drawing Sheets

INTELLIGENT ENERGY DEVICE BASED ON REAL-TIME VISUAL ANALYSIS OF LAPAROSCOPIC VIDEO

BACKGROUND OF THE INVENTION

Ultrasonic scalpel is a crucial surgical instrument in laparoscopy, used to simultaneously cut and cauterize (or coagulate) tissue. Advanced bi-polar device also provides similar capability for vessel sealing and cut, but general in a separate sequence. There are many other similar energy devices that use laser or microwave to provide different functions in surgeries. Laparoscopic camera has traditionally been used to provide visual guidance for ultrasonic scalpel and other instruments in laparoscopic surgery. Besides giving surgeons real-time view of the inside of patient, intelligent analysis of laparoscopic video can also generate rich signals for instrument setting/mode selection, for optimal cutting and cauterizing performance. For example, ultrasonic scalpel could have different mode for vessels of various diameter, or different setting for cutting artery vs. vein which have differing tissue thickness. Current design of ultrasonic scalpel does not take into account the information of specific tissue that is being cut and cauterized, but rather tries to compromise among various tissue types and characteristics.

SUMMARY OF THE INVENTION

In accordance with the present disclosure, with intelligent and real-time analysis of laparoscopic videos, identifying the characteristics of tissue to be cut and cauterized by ultrasonic scalpel, such information can be fed back into the device console to select proper mode for optimal performance.

In one embodiment, this disclosure describes an intelligent energy device, collaborating with scope in laparoscopy, for selecting proper setting and mode of the energy device. The energy device has multiple pre-set modes for cutting and cauterizing various types of tissues, such as vessels of different diameter, or vein vs. artery. Instead of relying on surgeons to manually select the proper cutting mode, the energy device utilizes the visual images captured from scope in laparoscopy to recognize characteristics of the tissue, and automatically select the proper mode.

Such intelligent energy device would increase its ease of use and reduce the burden of decision making for surgeons. Instead of having to manually recognizing tissue characteristics and quantifying them according to the tool being used, the surgeons can focus on other factors during surgery.

Current energy device could provide different modes for different tissue characteristics, e.g., 'advance' mode for cutting vessels of large diameter. However, selecting the proper mode relies on surgeon's judgment and is done manually. This increases the surgeon's burden of decision-making and the number of manually performed steps during operation. In some embodiments, this disclosure provides an automatic mechanism of selecting proper mode, using images captured from the scope, eliminating the need for the surgeons to manually select cutting modes. In alternative embodiments, the disclosure provides a system that will have various operation mode designed and preloaded into the system console and that can recommend to the operators (e.g., surgeons) an optimal mode for the procedure being performed.

DETAILED DESCRIPTION

In the following description of preferred embodiments, reference is made to the accompanying drawings which form a part hereof, and in which it is shown by way of illustration specific embodiments, which can be practiced. It is to be understood that other embodiments can be used and structural changes can be made without departing from the scope of the embodiments of this disclosure.

Figure 1:
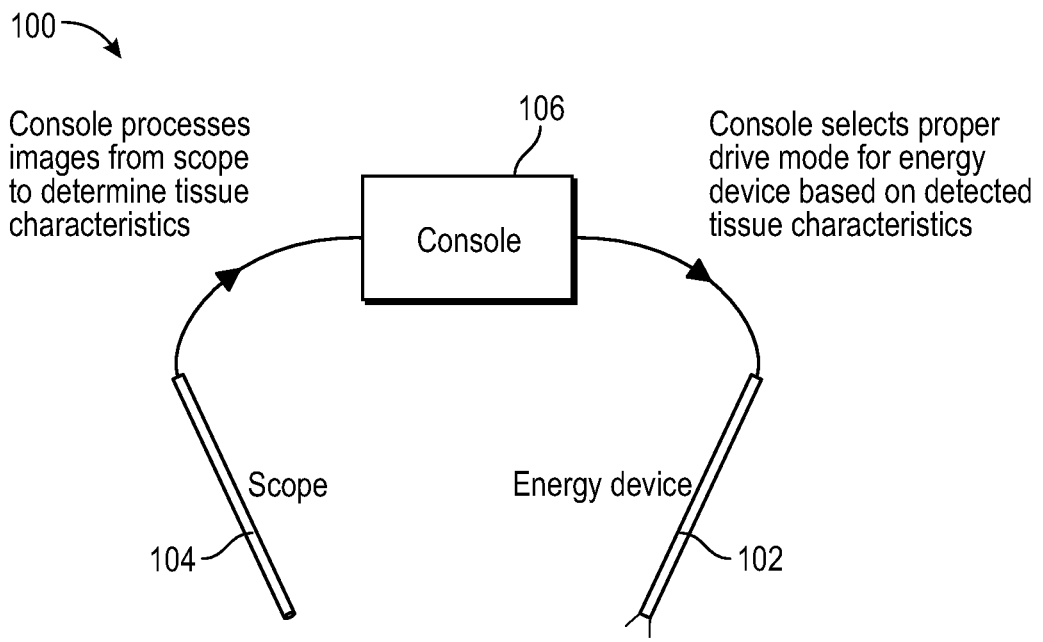
FIG. 1 illustrates an intelligent system based on real-time visual analysis of laparoscopic video, in accordance with an embodiment of the present disclosure.

Embodiments of the disclosure describe an intelligent energy device, collaborating with scope in laparoscopy, for selecting proper setting and mode of the energy device. The energy device has multiple pre-set modes for cutting and cauterizing various types of tissues, such as vessels of different diameter, or vein vs. artery. Instead of relying on surgeons to manually select the proper cutting mode, the energy device utilizes the visual images captured from scope in laparoscopy to recognize characteristics of the tissue, and automatically select the proper mode. Such intelligent energy device would increase its ease of use and reduce the burden of decision making for surgeons. Instead of recognizing tissue characteristics manually, the surgeons can focus on other factors during surgery In one embodiment, this disclosure describes an intelligent ultrasonic scalpel or RF energy device that collaborates closely with laparoscopic camera, to automatically select proper cutting mode for the tissue type and characteristics identified from analyzing laparoscopic images in real time. The system 100 of FIG. 1 includes an operation device (e.g., a scalpel or energy device) 102 and a scope with a built-in camera (e.g., a laparoscopic camera) 104. Both the operation device 102 and scope 104 are connected to a console 106. The console 106 can receive and process the images captured from the camera of the scope 104, automatically select and set the optimal operation mode of the operation device 102 and drive the operation device 102. It should be understand that, although FIG. 1 illustrates a single console, console 106 can include multiple devices in communication with each other and other devices (e.g., 102, 104) of system 100. The operation device 102 and the scope 104 can be connected to the console 106 by wires or wireless connections (Bluetooth, Wi-Fi, etc.).

Figure 2:
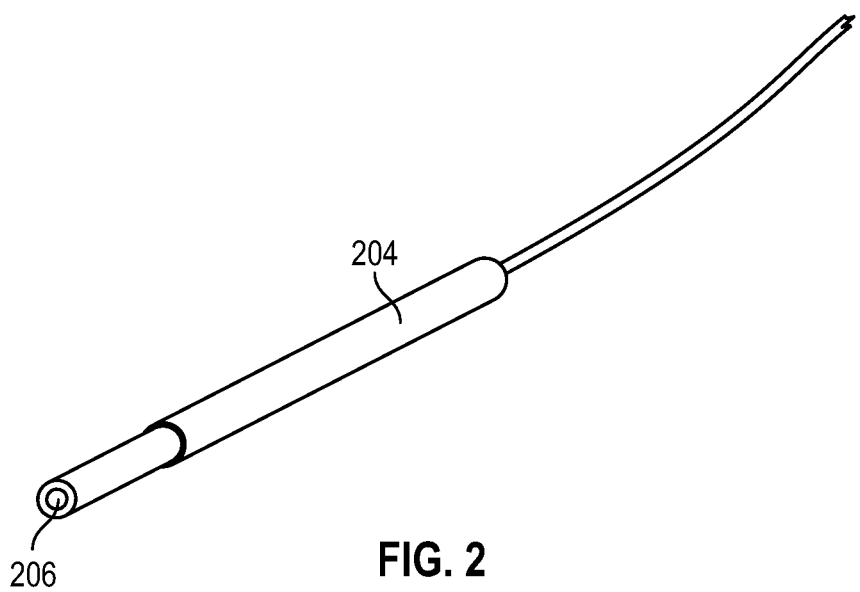
FIG. 2 illustrates an exemplary embodiment of the scope of FIG. 1, according to an embodiment of the present disclosure.

FIG. 2 illustrates an exemplary embodiment of the scope 104 of FIG. 1. The scope 204 can include a camera with lens 206 pointing outward from a tip of the scope 204. The camera can be any camera of suitable size capable of capturing static images and/or videos. In addition, the scope 204 can include other components such as a light source (not illustrated in FIG. 2).

Figure 3:
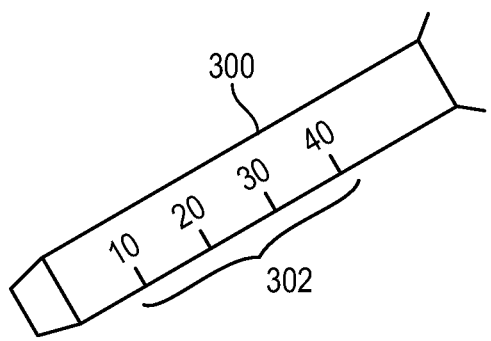
FIG. 3 illustrates an exemplary embodiment of the operation device of FIG. 1, according to an embodiment of the present disclosure.

FIG. 3 illustrates an exemplary embodiment of the operation device 102 of FIG. 1. In some embodiments, the operation device 300 can, for example, be a scalpel such as an ultrasonic scalpel/shear or one of various types of RF energy devices. In other embodiments, the operation device 300 can be laser or microwave devices. To enable measuring tissue geometry such as length/width/diameter, the scalpel can include measuring markings 302 near its tip, such as engraved lines or drilled hole whose size is known. The markings 302 can be designed for the specific operation device 300 to work with the computer vision software in the console.

In operation, the scope and the operation device can be introduced in the same or different trocar ports, depending on the use.

Figure 4:
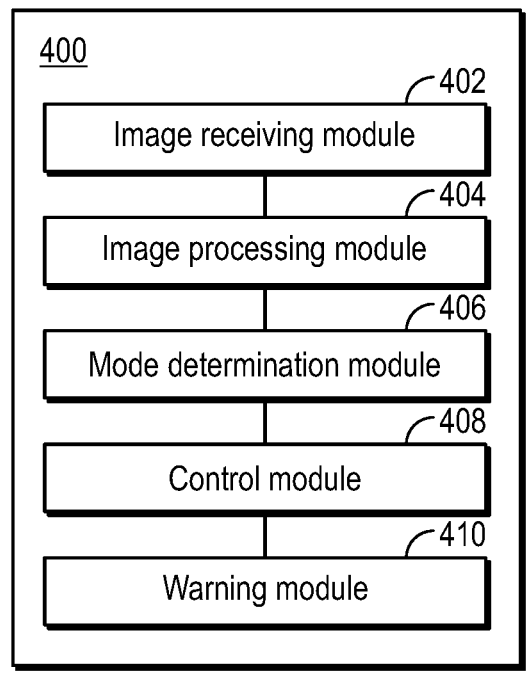
FIG. 4 illustrates the exemplary modules of the console, according to an embodiment of the disclosure.

FIG. 4 illustrates the exemplary modules of the console 106, according to an embodiment of the disclosure. The console 400 of FIG. 4 can include an image receiving module 402, an image processing module 404, a mode determination module 406, and a control module 408. The image receiving module 402 is configured to receive image data from the scope (not shown in FIG. 4) connected to the console 400. In some embodiments, the console 400 has access to the images/video being captured by the scope in real time with minimal delay. The image data is then transferred to the image processing module 404, which can process the data to determine, for example, the location of the scope with respect to the tissues being operated on and the type and/or characteristics of the tissues being captured by the scope. This can be done using specialized image processing software.

In one example, the image processing module 404 can recognize the operation device (e.g., ultrasonic scalpel/shears or RF energy devices) and locate its tip in the images/videos (e.g., laparoscopic images) received from the image receiving module 402. The image processing module 404 can also recognize the type of tissue that is in close proximity to the top of the operation device (e.g., the scalpel tip). For example, the image processing module 404 can identify the issue from the image as one of four types: (1) non-vessel, non-critical tissue; (2) artery; (3) vein; (4) non-vessel, critical tissue such as nerve. The operation device connected to the console can have multiple operation modes that are designed to work with each of the different types of tissues.

The mode determination module 406 can determine and select one of the operation modes based on the information provided by the image processing module 404. For example, for non-vessel tissue, the mode determination module can set the operation device (e.g., an energy device) to "normal mode" for cutting and cauterizing. The normal mode can be the default mode of the operation device. The normal mode can also be the mode in which the device operates in the absence of any input of tissue characterization from the image processing module 404.

For artery or vessel tissue (type 2 or 3), the console will use the artery vs. vein classification, as well as the measurement information, to select proper mode of the operation device (e.g., ultrasonic scalpel or RF devices) for optimal cutting and cauterizing. In one embodiment, if the tissue is identified by the image processing module 404 as artery or vein (type 2 or 3), the image processing module 404 can take the additional step of measuring the diameter of the blood vessel. Specifically, the image processing module will first determine the diameter of the blood vessel based on a number of pixels in the image. The image processing module 404 can additionally identify and segment out the measuring markings on the operation device from the images. The measuring markings can then be used to translate tissue measurement from pixels to metrics. Through such mechanism, the image processing module 404 can obtain information on the diameter of the blood vessel on which the operation device is to be applied.

The console 400 can have pre-designed settings and/or driving modes for the operation device (e.g., ultrasonic scalpel or RF device) to cut and cauterize (1) artery of 5 mm or larger; (2) artery smaller than 5 mm; (3) vein of 5 mm or larger; (4) vein smaller than 5 mm. It is also possible to further customize the algorithm utilized by the mode determination module 406 for additional tissue or vessel type and/or size. For example, there can be a protection mode to reduce or deactivate the energy when the energy device is touching or adjacent to critical organs or nerves, and/or a mode further differentiate the vessel size for those larger than 7 mm.

These special modes can be algorism(s) driven based on the input from image processing module 404. It can require a unique combination of voltage, current, and power control to achieve the best output from the operation device for each of the scenario discussed above.

The operation device (e.g., ultrasonic or RF devices) can have two major functions based on the tissue types, first, cut only and second, cut and seal for vessels. In existing devices, there can be multiple levels of energy power that can be chosen and deployed manually by the operator of the device based on his judgement. Embodiments of this disclosure can provide alternative or additional modes based on advanced computer vision recognition features. These alternative or additional modes can be selected automatically by the console 400 to reduce the burden on the surgeon and allow the device to be used more effectively.

Once the mode determination module 406 determines which mode the operation device should operate in, the control module 408 of the console can set the operation device in the selected mode. The operation device can then operate accordingly based on the parameters (e.g., energy level) of the particular mode.

In some embodiments, the console can make real time adjustments to the operating mode of the operation device based on live images captured by the scope. Additionally or alternatively, the console can also record recognition and measurement results generated during the procedure and save such information to disk as system logs.

In one embodiment, the console can also include a warning module configured to provide a warning to the user when the image processing module recognizes a metal component such as a grasper or irrigator getting close to the operation device, which may bring the risk of damaging the operation device. The warning module can provide an alert, visual or audible, to remind the operator that the devices are getting too close.

The exemplary modules 402, 404, 406, 408, 410 of console 400 of FIG. 4 can be implemented in software, firmware, hardware, or any combination of the three.

Figure 5:
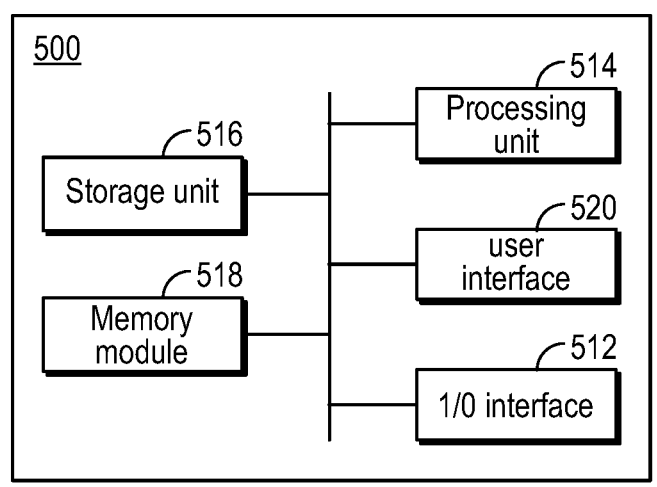
FIG. 5 illustrates the exemplary hardware components of the console of FIG. 1, according to an embodiment of the disclosure.

FIG. 5 illustrates the exemplary hardware components of the console of FIG. 1, according to an embodiment of the disclosure. The console 500 can include, among other things, an I/O interface 512, a processing unit 514, a storage unit 516, a memory module 518, and user interface 520.

I/O interface 512 can be configured for communication with the scope and the operation device (not shown in FIG. 5) that are connected to the console 500. The communication can be via any suitable wired or wireless channels. Processing unit 514 may be configured to receive signals and process the signals to determine a plurality of conditions of the operation of device 500. Processing unit 514 may also be configured to generate and transmit command signals, via I/O interface 512, to actuate components such as the operation device connected to the console 500.

Storage unit 516 and/or memory module 518 may be configured to store one or more computer programs that may be executed by processing unit 514 to perform functions of the device 500. For example, the various exemplary modules of FIG. 4 can reside in storage unit 516 and/or memory module 518. Storage unit 516 and memory 518 can be non-transitory computer-readable medium storing instructions which, when executed, cause one or more processors 514 to perform the method, as discussed in the various embodiments of the disclosure. The computer-readable medium can include volatile or non-volatile, magnetic, semiconductor, tape, optical, removable, non-removable, or other types of computer-readable medium or computer-readable storage devices. The computer-readable medium can have computer instructions stored thereon, as disclosed. In some embodiments, the computer-readable medium may be a disc or a flash drive having the computer instructions stored thereon.

It should be understood that console 500 of FIG. 5 can include additional components that are not shown in FIG. 5 and that some of the components shown in FIG. 5 may be optional in certain embodiments.

Figure 6:
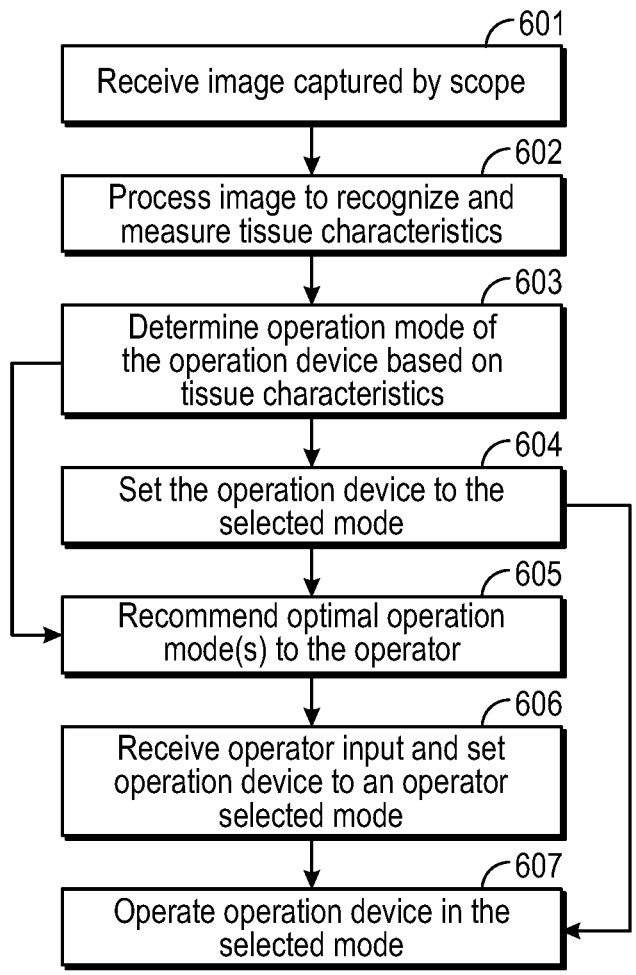
FIG. 6 is a flow chart illustrating the exemplary steps in a method of recommending an operation mode or automatically operating an operating device (e.g., ultrasonic scalpel/shears or RF energy devices), according to an embodiment of the disclosure.

FIG. 6 is a flow chart illustrating the exemplary steps in a method of automatically operating an operating device (e.g., ultrasonic scalpel/shears or RF energy devices), according to an embodiment of the disclosure.

First, the console receives images captured by a scope connected to the console. (Step 601). The console processes the images captured from scope to recognize and measure tissue characteristics. (Step 602) Then, the console determines the operating mode of the operation device based on the tissue characteristics and measurements. (Step 603) The console can be programmed to store pre-set modes for various tissue characteristics.

In one embodiment, once the mode is determined, the console can set the operation device to the selected mode. (Step 604). In an alternative embodiment, the console can recommend an optimal operation mode (or multiple operation modes) to the operator. (Step 605) The console can receive operator's input on which mode to use and set the operation device to that mode. (Step 606) Once the operation mode is chosen, the operation device can then cut and/or cauterize tissue with the mode selected by the console. (Step 607)

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

The invention claimed is:

1. A console comprising:
   an image receiving module configured to receive image data from a first device connected to the console;
   an image processing module in communication with the image receiving module, the image processing module configured to process the received image data to determine tissue characteristic data;
   a mode determination module in communication with the image processing module, the mode determination module configured to determine, based on the tissue characteristic data, an operation mode of a second device connected to the console; and
   a control module in communication with the mode determination module, the control module configured to control an operation of the second device based on the determined operation mode;
   wherein the second device has a plurality of operation modes comprising (1) a first mode in which the second device operates in an absence of any input from the image processing module and (2) a second mode that deactivates an energy from the second device when the second device is within a predetermined distance to an issue determined to have a first tissue characteristic.

2. The console of claim 1, further comprising a warning module configured to provide a warning when the image processing module determines that a third device is within a predetermined distance of the second device.

3. The console of claim 2, wherein the warning comprises at least one of an audio and a visual warning.

4. The console of claim 1, wherein the first device comprises a scope with a camera, the camera configured to capture one or more images comprising the image data.

5. The console of claim 4, wherein the camera is at the tip of the scope.

6. The console of claim 5, wherein the camera comprises a laparoscopic camera.

7. The console of claim 1, wherein the second device is an operation device configured to perform an operation on tissues.

8. The console of claim 7, wherein the operation device comprises a scalpel or an energy device.

9. The console of claim 1, wherein the mode determination module is further configured to select among a plurality of pre-configured modes the operation mode of the second device.

10. The console of claim 9, wherein the pre-configured modes comprise a normal mode for operating on non-critical tissues and a special mode for operating on critical tissues.

11. The console of claim 1, wherein the image processing module is further configured to determine a size of tissue from the image data.

12. The console of claim 11, wherein the image processing module determines the size of the tissue based on a number of pixels corresponding to the tissue.

13. A computer-implemented method of controlling an operation device comprising:
   receive image data from a scope;
   processing the received image data to determine tissue characteristic data;
   determining, based on the tissue characteristic data, an operation mode of the operation device;
   controlling an operation of the operation device based on the determined operation mode;
   setting the operation device to a first mode in which the operation device operates in an absence of any image data; and
   setting the operation device to a second mode that deactivates an energy from the operation device when the operation device is within a predetermined distance to an issue determined to have a first tissue characteristic.

14. The computer-implemented method of claim 13, further comprising determining that another device is within a predetermined distance of the operation device; and providing a warning in response to the determination.

15. The computer-implemented method of claim 13, wherein the operation device comprises a scalpel or an energy device.

16. The computer-implemented method of claim 13, wherein determining, based on the tissue characteristic data, the operation mode of the operation device comprises selecting among a plurality of pre-configured modes.

17. The computer-implemented method of claim 16, wherein the pre-configured modes comprise a normal mode for operating on non-critical tissues and a special mode for operating on critical tissues.

18. The computer-implemented method of claim 13, wherein processing the received image data further comprises determining a size of tissue from the image data.

* * * * *